United States Patent
Cai et al.

(10) Patent No.: US 10,747,898 B2
(45) Date of Patent: Aug. 18, 2020

(54) DETERMINING PRIVACY FOR A USER AND A PRODUCT IN A PARTICULAR CONTEXT

(71) Applicant: International Business Machines Corporation, Armonk, NY (US)

(72) Inventors: Keke Cai, Beijing (CN); HongLei Guo, Beijing (CN); Lin Luo, Beijing (CN); Zhong Su, Beijing (CN); Changhua Sun, Beijing (CN); Guoyu Tang, Beijing (CN); Enliang Xu, Beijing (CN); Li Zhang, Beijing (CN); Shiwan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 505 days.

(21) Appl. No.: 15/298,952

(22) Filed: Oct. 20, 2016

(65) Prior Publication Data
US 2018/0113996 A1    Apr. 26, 2018

(51) Int. Cl.
*G06F 21/62* (2013.01)
*G06F 21/31* (2013.01)
*G06N 20/00* (2019.01)

(52) U.S. Cl.
CPC ........ *G06F 21/6245* (2013.01); *G06F 21/316* (2013.01); *G06F 2221/2111* (2013.01); *G06N 20/00* (2019.01)

(58) Field of Classification Search
CPC ..... G06F 21/10; G06F 21/316; G06F 21/6245
USPC .......................................................... 726/26
See application file for complete search history.

(56) References Cited

U.S. PATENT DOCUMENTS

| 8,793,255 | B1* | 7/2014 | Bilinski | G06F 17/30867 |
| | | | | 707/740 |
| 2013/0326578 | A1* | 12/2013 | Blom | G06F 21/6218 |
| | | | | 726/1 |
| 2014/0053228 | A1* | 2/2014 | Mahadevan | G06F 16/176 |
| | | | | 726/1 |
| 2014/0304814 | A1* | 10/2014 | Ott | G06F 17/274 |
| | | | | 726/22 |
| 2015/0235050 | A1 | 8/2015 | Wouhaybi et al. | |

FOREIGN PATENT DOCUMENTS

WO    2007015184 A2    2/2007

* cited by examiner

*Primary Examiner* — Eleni A Shiferaw
*Assistant Examiner* — Angela R Holmes
(74) *Attorney, Agent, or Firm* — Amin, Turocy & Watson, LLP

(57) ABSTRACT

Techniques are provided for automated privacy scoring of user information. In one example, a system comprises a memory that stores computer executable components, and a processor that executes computer executable components stored in the memory. The computer executable components can comprise a privacy scoring component that employs a privacy identification model to generate a privacy score for a user and a product in the particular context based on information associated with the user and the product in the particular context. The computer executable components can also comprise a privacy enforcement component that implements one or more privacy features on the information based on the privacy score.

20 Claims, 10 Drawing Sheets

DETERMINING PRIVACY FOR A USER AND A PRODUCT IN A PARTICULAR CONTEXT

BACKGROUND

The subject disclosure relates generally to privacy determinations and in particular to determining privacy for a user and a product in a particular context.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate determining privacy for a user and a product in a particular context are described.

According to an embodiment, a system is provided. The system comprises a memory that stores computer executable components; and a processor that executes the computer executable components stored in the memory. The computer executable components can comprise a privacy scoring component that employs a privacy identification model to generate a privacy score for a user and a product in the particular context based on information associated with the user and the product in the particular context, and a privacy enforcement component that implements one or more privacy features on the information based on the privacy score.

In another embodiment a computer-implemented method is provided. The computer-implemented method can comprise determining, by a system operatively coupled to a processor, a product feature and a behavioral feature associated with a user and a product in a particular context; determining, by the system using a psycholinguistic model, a personality feature associated with the user; and determining, by the system using a privacy identification model, the product feature, the behavioral feature, and the personality feature, a privacy score for the user and the product in the particular context.

In another embodiment, a computer program product for implementing privacy for user information is provided. The computer program product can comprise a computer readable storage medium having program instructions embodied therewith. The program instructions can be executable to determine a privacy score associated with a user and a product in a particular context based on respective scores for personality features associated with the user, determine one or more privacy features associated with the privacy score, and implement the one or more privacy features on information associated with the user and the product in the particular context.

DETAILED DESCRIPTION

Figure 1:
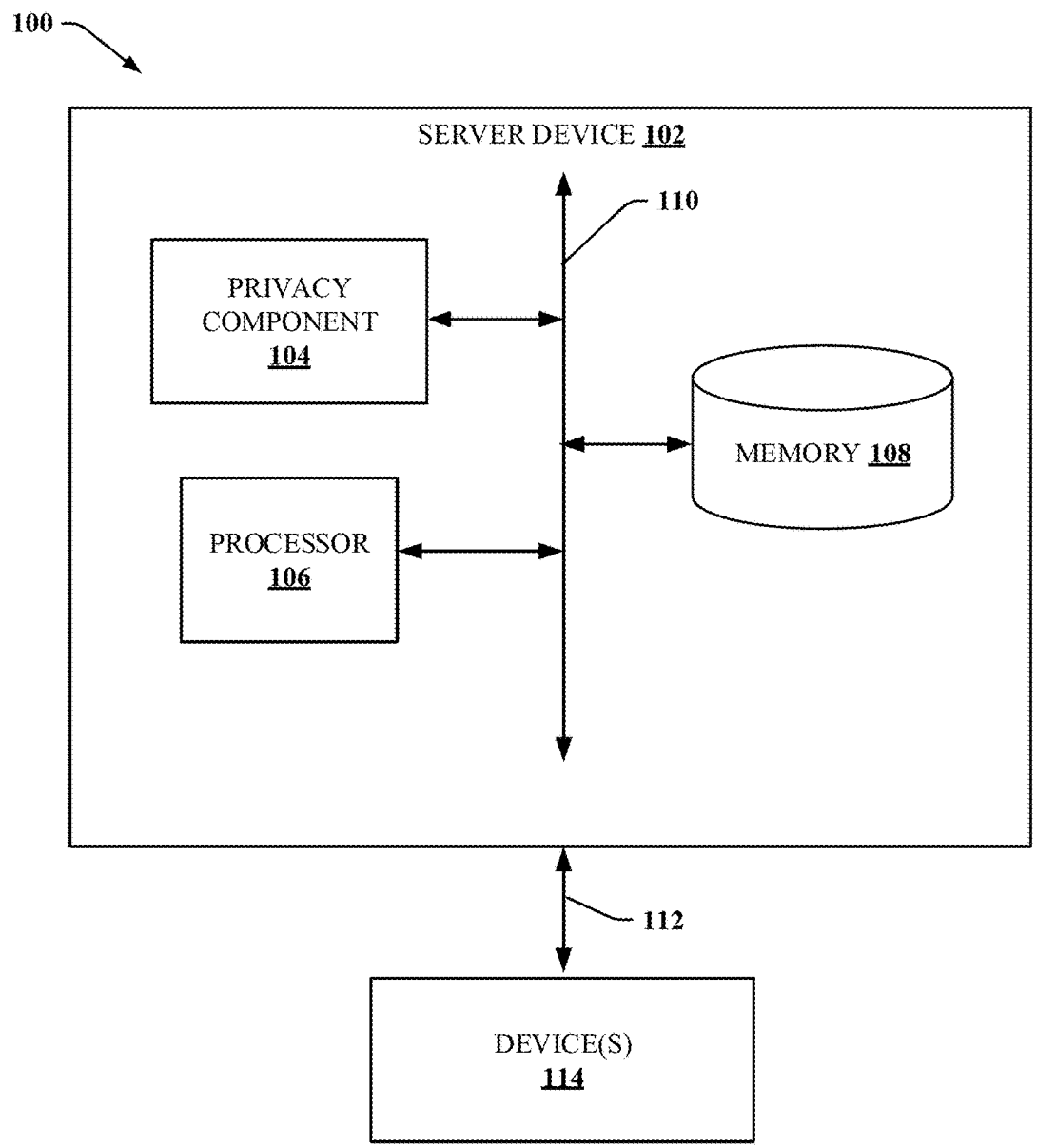
FIG. 1 illustrates a block diagram of an example, non-limiting system that facilitates determining privacy for a user and a product in a particular context in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however in various cases, that the one or more embodiments can be practiced without these specific details.

As users interact with many different computing systems in their daily activities, a vast variety of information can be collected about them with their knowledge in some cases and without their knowledge in other cases. Some of this information can be employed by a computing system (which can be different from a computing system that collected the information) to provide personalization for the user and/or other users associated with the user, such as in a non-limiting example, product recommendations, targeted advertising, customized user interface navigation, customized web pages, customized search results, customized coupons, or any other suitable personalization for a user when interacting with a computing system. For example, a search engine can collect information related to searches performed by a user, and allow this information to be used by an advertisement engine to generate customized advertisements to the user. An owner entity of the search engine can be different from the owner entity of the advertisement engine, and information about the user can be exchanged between their systems, possibly for a fee. In another example, a credit card company's data system can compile information regarding purchases that a user made, and share this information with a retailer for a fee, so that the retailer can provide customized coupons to the user. In a further example, a social network can collect information regarding a gaming application that a user plays and employ that information in an advertisement related to the gaming application presented to a friend of the user on the social network.

The information collected about a user can be sensitive, and the user may not want some of the information to be employed for personalization or shared with third parties. For example, a user can want information regarding a political blog that the user visited to remain confidential. In another example, a country in which a user lives can have legal restrictions on particular activities, and the user may want to keep data regarding engagement in such activity from being employed for personalization and/or shared with third parties. In a further example, a user can have purchased a firearm, and not want information related to the firearm purchase to be employed for personalization or shared with third parties.

Some systems can provide privacy configuration settings that allow a user to specify restrictions on information collected about them is employed for personalization and/or sharing with third parties. However, these settings are typically very general and apply to all of the information collected about the user, and don't allow for granular settings based on the type/context of information. Moreover, providing a user with the ability to configure privacy at a very detailed granularity can be too time-consuming for the user to setup and impractical for a system to deploy. For example, there are millions of products and thousands of contexts in which the products can be employed, which can require additional storage usage for configuration user interfaces for setting up the privacy settings, and additional processing usage and bandwidth usage for interactions of the user with the configuration user interfaces. Furthermore, user feelings regarding privacy can change over time resulting in the user having to frequently update their privacy settings based on their current perspective on privacy and/or different products they employ.

To address the challenges in determining privacy for a user and a product in a particular context as described herein, one or more exemplary embodiments of the invention can employ a privacy identification model that can employ product features, behavioral features, personality features (e.g., psycholinguistically derived personality features), and/or user feedback to determine a privacy score for a user and/or a product in a particular context. The privacy score can be employed to implement for the user one or more privacy features corresponding to the privacy score.

One or more embodiments of the subject disclosure is directed to computer processing systems, computer-implemented methods, apparatus and/or computer program products that facilitate efficiently, effectively, and automatically (e.g., without direct human involvement) determine privacy for a user and a product in a particular context. The computer processing systems, computer-implemented methods, apparatus and/or computer program products can employ hardware and/or software to solve problems that are highly technical in nature (e.g., adapted to perform automated determination of a privacy score for a user and a product in a particular context, adapted to generate and/or employ one or more different detailed, specific and highly-complex models) that are not abstract and that cannot be performed as a set of mental acts by a human. For example, a human, or even thousands of humans, cannot efficiently, accurately and effectively manually gather and analyze thousands of data elements related to product features, behavioral features, personality features and/or user feedback in a real-time network based computing environment to determine privacy for a user and a product in a particular context. One or more embodiments of the subject computer processing systems, methods, apparatuses and/or computer program products can enable the automated determination of privacy for a user and a product in a particular context in a highly accurate and efficient manner. By employing automated analysis of product features, behavioral features, personality features and/or user feedback with a privacy identification model to determine privacy for a user and a product in a particular context, the processing time and/or accuracy associated with the existing automated privacy systems is substantially improved. Additionally, the nature of the problem solved is inherently related to technological advancements in Internet-based media and/or transactions that have not been previously addressed in this manner. Further, one or more embodiments of the subject techniques can facilitate improved performance of automated privacy systems that provides for more efficient usage of storage resources, processing resources, and network bandwidth resources to provide highly granular and accurate privacy determinations for a user and a product in a particular context.

FIG. 1 illustrates a block diagram of an example, non-limiting system 100 that facilitates determining privacy for a user and a product in a particular context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

As shown in FIG. 1, the system 100 can include a server device 102, one or more networks 112 and one or more devices 114. Server device 102 can include privacy component 104 that can facilitate determining privacy for a user and a product in a particular context. Server device 102 can also include or otherwise be associated with at least one included memory 108 that can store computer executable components (e.g., computer executable components can include, but are not limited to, the privacy component 104 and associated components), and can store any data generated by privacy component 104 and associated components. Server device 102 can also include or otherwise be associated with at least one processor 106 that executes the computer executable components stored in memory 108. Server device 102 can further include a system bus 110 that can couple the various components including, but not limited to, the privacy component 104, memory 108 and/or processor 106. While a server device 102 is shown in FIG. 1, in other embodiments, any number of different types of devices can be associated with or include the components shown in FIG. 1 as part of the privacy component 104. For example, devices 114 can include all or some of the components of privacy component 104. All such embodiments are envisaged.

Server device 102 can be any computing device that can be communicatively coupled to devices 114, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device 114 can be any device that can communicate information with server device 102, and/or any other suitable device that can employ information provided by service device 102. It is to be appreciated that server device 102, and/or device 114 can be equipped with communication components (not shown) that enable communication between server device 102 and/or device 114 over one or more networks 112.

The various components (e.g., privacy component 104, memory 108, processor 106, server device 102, devices 114, and/or other components) of system 100 can be connected either directly or via one or more networks 112. Such networks 112 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

Figure 2:
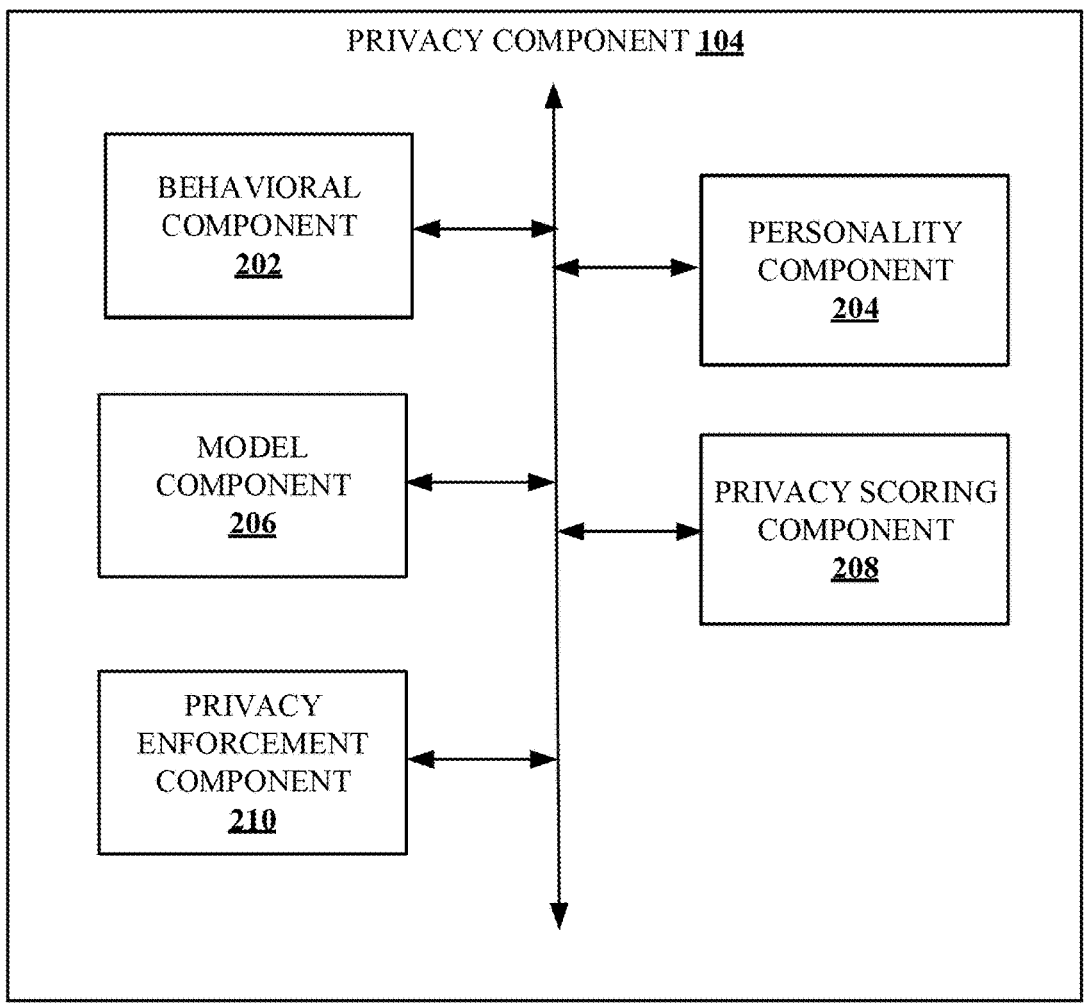
FIG. 2 illustrates a block diagram of an example, non-limiting privacy component that automatically determines privacy for a user and a product in a particular context in accordance with one or more embodiments described herein.

FIG. 2 illustrates a block diagram of an example, non-limiting privacy component 104 in accordance with one or more embodiments described herein. In one or more embodiments, the privacy component 104 can automatically determine privacy for a user and a product in a particular context. Privacy component 104 can include behavioral component 202 that can automatically analyze behavioral data associated with one or more users and determine product features 402 and/or behavioral features 404. As users interact with products, behavioral data describing the products and interactions of the users with the products can be gathered. The behavioral data can be gathered by behavioral component 202 (or another component of server device 102) directly and/or obtained by behavioral component 202 from one or more other devices 114 that monitor interactions between users and products. Behavioral component 202 can analyze the behavioral data to identify product features associated with products in the behavioral data, and identify behavioral features associated with user interactions of the products in the behavioral data.

In one or more embodiments, product features 402 can be characteristics of products with which the user has interacted (e.g., employed, purchased, visited, viewed, read, or had any other suitable interaction). A product can be any suitable item with which the user can have an interaction, non-limiting examples of which can include, but are not limited to, a purchased item or service, a website, a web page, a search engine, a keyword entered in a search query, an advertisement, an application, a widget, a pop-up display, a communication device, a chat system, a credit card, a library card, a physical location visited (e.g., store, school, office, government building, arena, geographic location, global positioning system coordinate, vehicle, or any other suitable physical location), or any other suitable item with which a user can interact. A product feature 402 can be a characteristic of product, non-limiting examples of which can include, but are not limited to, a product name, a product type, a product category, a model number, a brand identification, a manufacturer identification, a price, a stock keeping unit number, a web page address, an Internet protocol address, a geographic address, a product description, a customer demographic for which the product is targeted, or any other suitable characteristic associated with a product. Behavioral component 202 can search proprietary and/or public databases to determine product features associated with a product.

A behavioral feature 404 can be a description of a user interaction with a product in a context, non-limiting examples of which include a time of the interaction with the product, a location (e.g., physical location of user, physical location of product, virtual location (e.g., network web address, Internet protocol address, application user interface page, or any other suitable description of a virtual location) of product, virtual location of the user, or any other suitable location description) of the interaction with the product, an action (e.g., quickly closed the product, switch to another product, purchased the product, added product to wish list, contacted customer service about the product, employed the product, trial usage of the product, bookmarking the product, clicking an advertisement, entering a physical location, or any other suitable action a user can perform with the product) performed by the user during the interaction with the product, amount of time the user spent interacting with the product, a communication about the product with a contact of the user, or any other suitable description of an interaction a user can have with the product.

Privacy component 104 can also include personality component 204 that can employ a psycholinguistic model 304 to automatically analyze user data 302 associated with one or more users and determine personality features 306. User data 302 can be any textual data that is from words directly written or directly spoken by a user. For example, user data 302 can be a blog post written by the user, a posting on a social network site written by a user, an article written by a user, a poem written by a user, a book written by a user, a homework assignment written by the user, a white paper written by the user, an email message written by the user, a text message written by the user, a chat message written by the user, a resume written by the user, text converted from an audio recording of the user's spoken words (e.g., from a voicemail, a video, a song, an audio comment, a podcast, or any other suitable audio recording of a user's spoken words), or any other suitable textual data that is from words directly written or directly spoken by a user. In an example, personality component 204 can employ only publicly available user data 302 of a user. In another example, personality component 204 can employ confidential user data 302 associated with a user for which permission has been given by the user. The user data 302 can be gathered by personality component 204 (or another component of server device 102) directly and/or obtained by personality component 204 from one or more other devices 114 that monitor and/or gather user data 302.

Figure 3:
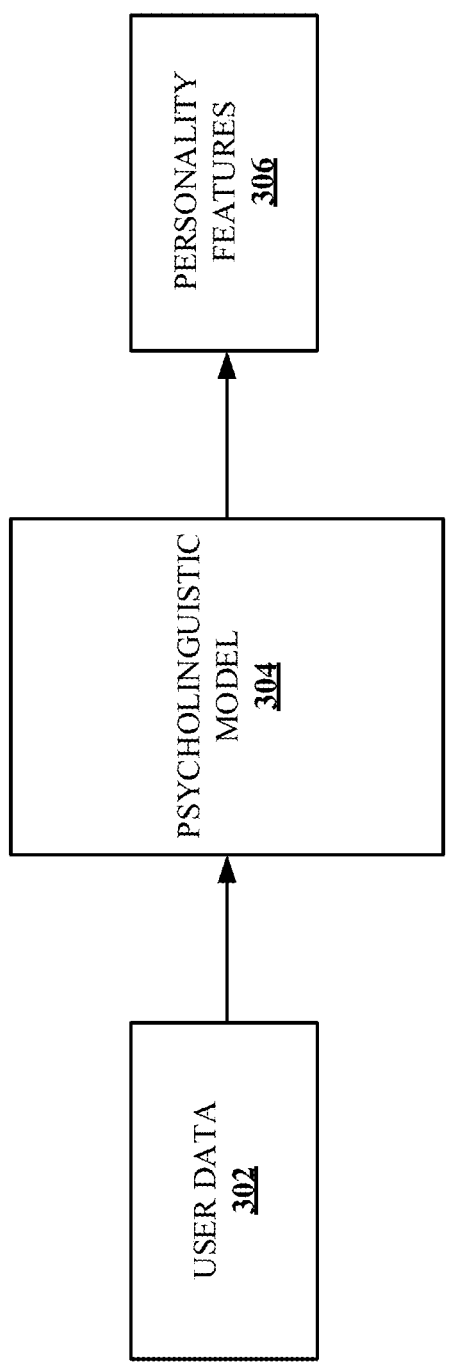
FIG. 3 illustrates a block diagram of an example, non-limiting psycholinguistic model that generates personality features in accordance with one or more embodiments described herein.

FIG. 3 illustrates a block diagram of an example, non-limiting psycholinguistic model 304 that generates personality features 306 in accordance with one or more embodiments described herein. Personality component 204 can provide user data 302 associated with one of more users as input to psycholinguistic model 304 that can output respective personality features 306 for the users. Non-limiting examples of psycholinguistic model 304 can include a Linguistic Inquiry and Word Count (LIWC) model, a Parsimonious Rule-based Model, a Satisfaction with Life (SWL) model, a static ego model, or any other suitable psycholinguistic model. Psycholinguistic model 304 can analyze text in the user data 302 for a user to determine personality features 306 for the user. The personality features can comprise personality trait categories and respective scores for the user in the personality trait categories. In a non-limiting example, the personality trait categories can be the "Big Five" personality trait categories of Openness, Conscientiousness, Extraversion, Agreeableness, Neuroticism. However, any suitable personality trait categories can be employed by psycholinguistic model 304. A score for a personality trait category can provide an indication of a level that the user matches the personality trait. For example, the score can be a percentage from 0 to 100, a value in a numerical range, a letter grade, a binary value, or any other suitable scoring mechanism that provides an indication of a level that the user matches the personality trait.

It is to be appreciated that personality component 204 can provide one or more user interfaces (not shown) that allow an operator of privacy component 104 to specify a psycholinguistic model 304 to employ.

Referring back to FIG. 2, privacy component 104 can also include model component 206 that can configure a privacy identification model 406 to automatically determine a privacy score 408 for a user and a product in a particular context. Privacy identification model 406 can employ one or more learning models for determining a privacy score 408 for a user and a product in a particular context, non-limiting examples of learning models which can include, but are not limited to, neural networks, Bayesian networks, support vector machine, deep learning, clustering algorithms, genetic algorithms, fuzzy logic, sparse dictionary learning, or any other suitable machine learning model.

Figure 4:
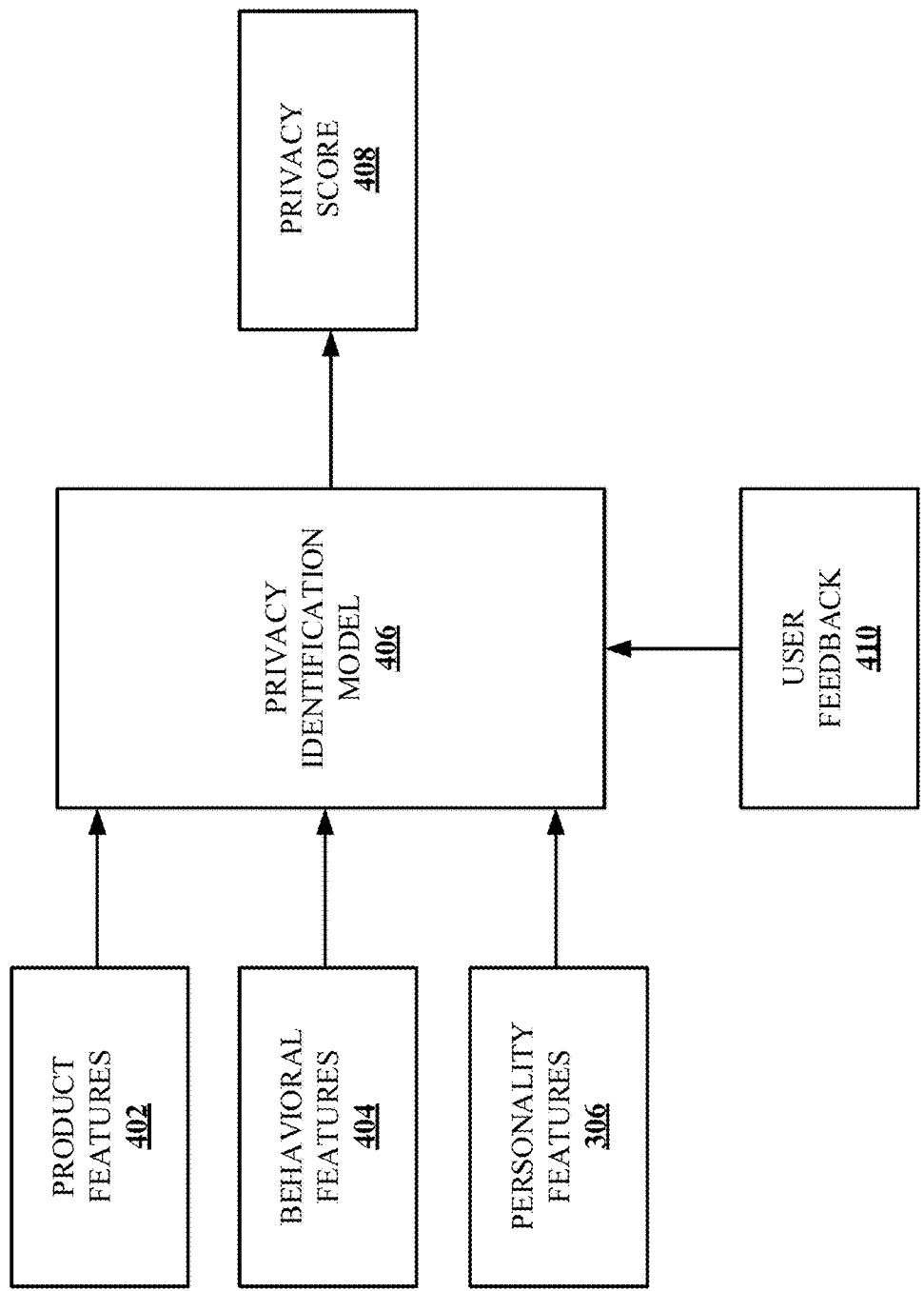
FIG. 4 illustrates a block diagram of an example, non-limiting privacy identification model that generates privacy scores in accordance with one or more embodiments described herein.

FIG. 4 illustrates a block diagram of an example, non-limiting privacy identification model 406 in accordance with one or more embodiments described herein. Privacy identification model 406 can take as input, product features 402, behavioral features 404, personality features 306, and/or user feedback 410 for a user and a product in a context, and using one or more learning models output a privacy score 408 for the for the user and the product in the context. It is to be appreciated that the user feedback 410 can be an optional input.

Model component 206 can train privacy identification model 406 using training data that comprises product features 402, behavioral features 404, personality features 306, and/or user feedback 410 for one or more (or, in some embodiments, a plurality of) users. In a non-limiting example, the users can comprise an exemplary set of users representative of a larger set of users for which privacy component 104 will determine privacy. In another non-limiting example, the training data can comprise historical product features 402, historical behavioral features 404, historical personality features 306, historical user feedback 410, and/or historical privacy scores 408 for one or more users that is used to train privacy identification model 406 for the one or more users. It is to be appreciated that any suitable training data can be employed by model component 206 to train privacy identification model 406. User feedback 410 can comprise an indication by a user of a privacy score for the user and a product in a particular context. For example, a user can specify their feedback on what the privacy score should be for the user and a product in a particular context. The user feedback 410 can be specific for the user to the product in the particular context, or can be a general indication by the user of a privacy setting for a product, a category of products, a context, a category of contexts, a global privacy setting for the user, or any other suitable mechanism by which the user can provide feedback on privacy related to the user, products, and/or contexts. Privacy scores in the training data associated with the plurality of users can be manually assigned, provided by the users, system generated, or obtained by any other suitable mechanism for obtaining privacy scores.

In a non-limiting example, behavioral data for a plurality of users can be provided to behavioral component 202 to generate product features 402 and behavioral features 404 for use in training data. In another non-limiting example, user data 302 for the plurality of users can be provided to personality component 204 to generate personality features 306 for use as training data.

It is to be appreciated that model component 206 can provide one or more user interfaces (not shown) that allow an operator of privacy component 104 to specify a learning model to employ in privacy identification model 406.

Referring back to FIG. 2, privacy component 104 can also include privacy scoring component 208 that can automatically determine a privacy score 408 for a user and a product in a particular context. Privacy scoring component 208 can obtain behavioral data associated with a user and a product in a context and provide the behavioral data to behavioral component 202 to generate product features 402 and behavioral features 404 associated with the behavioral data. Privacy scoring component 208 can also instruct personality component 204 to obtain user data 302 associated with a user and generate personality features 306 associated with the user. In another non-limiting example, personality component 204 can continually or at a defined interval obtain updated user data 302 associated with a user and generate updated personality features 306 associated with the user.

Privacy scoring component 208 can provide the product features 402 and the behavioral features 404 associated with the user and the product in the particular context, provide the personality features 306, and optionally provide user feedback 410 associated with the user that if it is available, to privacy identification model 406 to generate a privacy score 408 for the user and the product in the particular context. A privacy score 408 for the user and the product in the particular context can provide a predicted indication of a level a privacy that the user desires to maintain for information (e.g., behavioral data, product features 402, behavioral features 404, and/or any other suitable information) associated with the user and the product in the particular context. For example, privacy score 408 can be a percentage from 0 to 100, a value in a numerical range, a letter grade, a binary value, or any other suitable scoring mechanism that provides an indication of a level a privacy that the user desires to maintain for information associated with the user and the product in the particular context.

In a non-limiting example, privacy scoring component 208 can determine a privacy score 408 for a user and a product in a particular context in real time as the user interacts with the product in the context. In another non-limiting example, privacy scoring component 208 perform a batch operation at a defined interval to determine respective privacy scores 408 for one or more users for products in particular contexts. It is to be appreciated that privacy scoring component 208 can determine a privacy score 408 for a user and a product in a particular context at any suitable time defined by the system, an operator, and/or a user.

It is to be appreciated that privacy scoring component 208 can determine a privacy score 408 for a new user for a product in a particular context based on privacy scores 408 of previous users with similar personality features 306 to the new user.

Privacy component 104 can also include privacy enforcement component 210 that can automatically implement one or more privacy features for a user in relation to a privacy score 408 for a user and a product in a particular context. In a non-limiting example, privacy enforcement component 210 can access a mapping of privacy score 408 values to privacy features. For example, each privacy score 408 value can be mapped to one or more privacy features that should be implemented for the user. In another example, ranges of privacy score 408 values can be mapped to one or more privacy features that should be implemented for the user. In a non-limiting example, a privacy feature can provide a restriction on usage of information (e.g., behavioral data, product features 402, behavioral features 404, and/or any other suitable information) associated with the user and the product in the particular context. For example, a privacy feature can prevent all usage of information associated with the user and the product in the particular context by a system or third parties. In another example, a privacy feature can allow usage of information associated with the user and the product in the particular context by the system and prevent usage of the information by third parties. In a further example, a privacy feature can allow usage of a subset of information associated with the user and the product in the particular context by the system and/or third parties. In an additional example, a privacy feature can allow usage of all information associated with the user and the product in the particular context by the system and/or third parties. In another example, a privacy feature can allow usage of all or some portion information associated with the user and the product in the particular context by the system and/or third parties in one or more particular contexts. In another example, a privacy feature can allow usage of all or some portion information associated with the user and the product in the particular context by the system and/or third parties in association with one or more particular products. It is to be appreciated that a privacy feature can implement any suitable restriction or allowance on usage of information associated with the user and the product in the particular context by the system and/or third parties.

In a non-limiting example, a higher privacy score indicative of higher level of desired privacy can be mapped to a higher privacy feature that provides a more restrictive usage of information, than a lower privacy score indicative of lower level of desired privacy that is mapped to a lower privacy feature that provides a less restrictive usage of information. For example a privacy score of 4 can allow unrestricted usage of the information, a privacy score of 3 can allow a system and a third party to use the information, a privacy score of 2 can allow a system to use the information, but not a third party, and a privacy score of 1 does not allow any usage of the information.

It is to be appreciated that privacy enforcement component 210 can provide one or more user interfaces (not shown) that allow a user and/or an operator of privacy component 104 to specify mappings between privacy score 408 values and privacy features.

While FIGS. 1, 2, 3, and 4 depict separate components in server device 102, it is to be appreciated that two or more components can be implemented in a common component. Further, it is to be appreciated that the design of the server device 102 can include other component selections, component placements, etc., to facilitate automatically determining privacy for a user and a product in a particular context in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to automatically determining privacy for a user and a product in a particular context. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems automatically determining privacy for a user and a product in a particular context in a live environment by improving processing efficiency among processing components in these systems, reducing delay in processing performed by the processing components, and/or improving the accuracy in which the processing systems automatically determine privacy for a user and a product in a particular context.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 5:
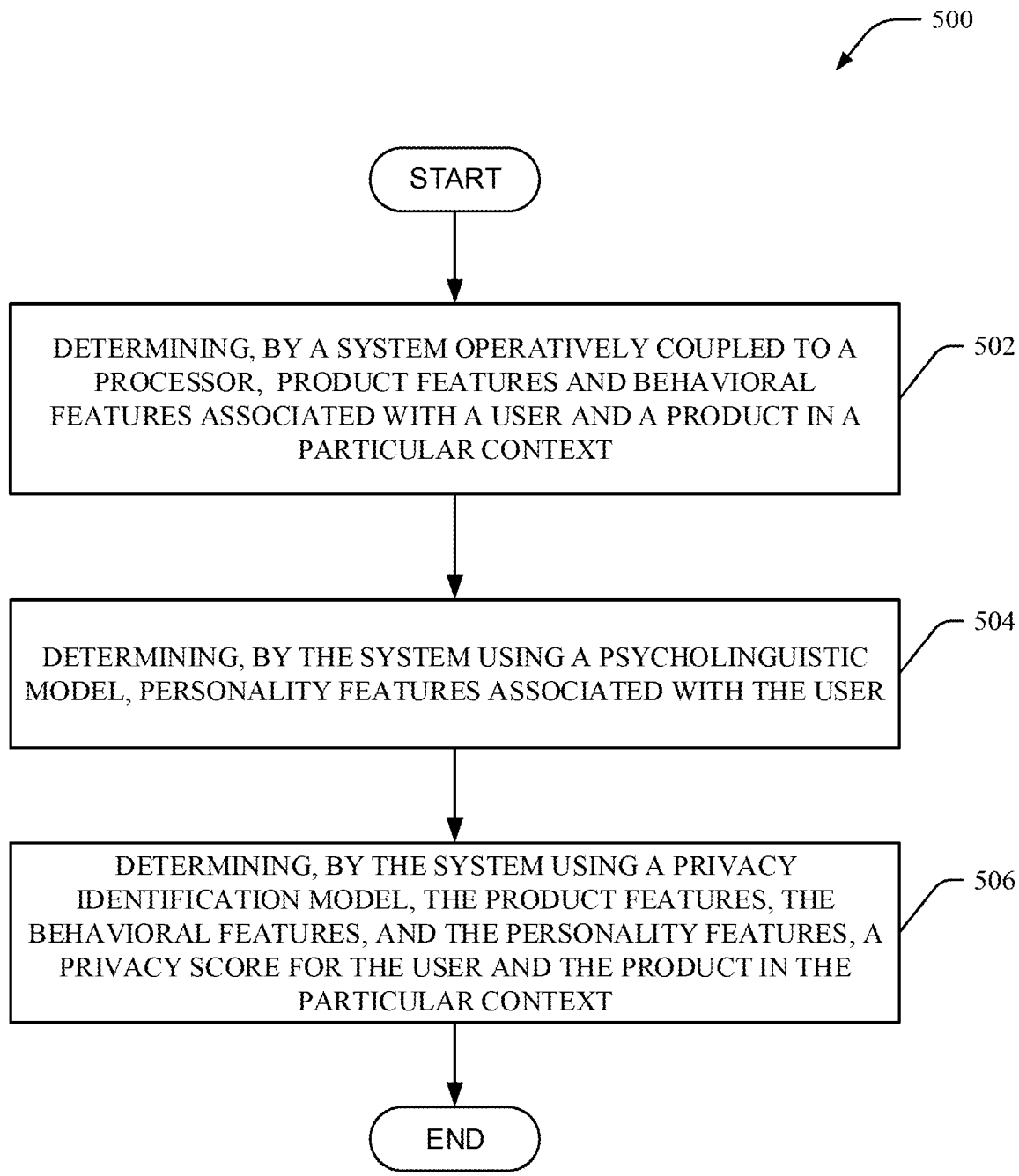
FIG. 5 illustrates a flow diagram of an example, non-limiting computer-implemented method that facilitates determining a privacy score for a user and a product in a particular context in accordance with one or more embodiments described herein.

FIG. 5 illustrates a flow diagram of an example, non-limiting computer-implemented method 500 that facilitates determining a privacy score for a user and a product in a particular context in accordance with one or more embodiments described herein. Repetitive description of like elements employed in other embodiments described herein is omitted for sake of brevity.

At 502, product features and behavioral features associated with a user and a product in a particular context are determined by a system operatively coupled to a processor (e.g., via a behavioral component 202, a privacy component 104, and/or a server device 102). At 504, personality features associated with the user are determined by the system using a psycholinguistic model (e.g., via a personality component 204, a privacy component 104, and/or a server device 102). At 506, a privacy score for the user and the product in the particular context is determined by the system using a privacy identification model, the product features, the behavioral features, and the personality features (e.g., via a privacy scoring component 208, a model component 206, a privacy component 104, and/or a server device 102).

Figure 6:
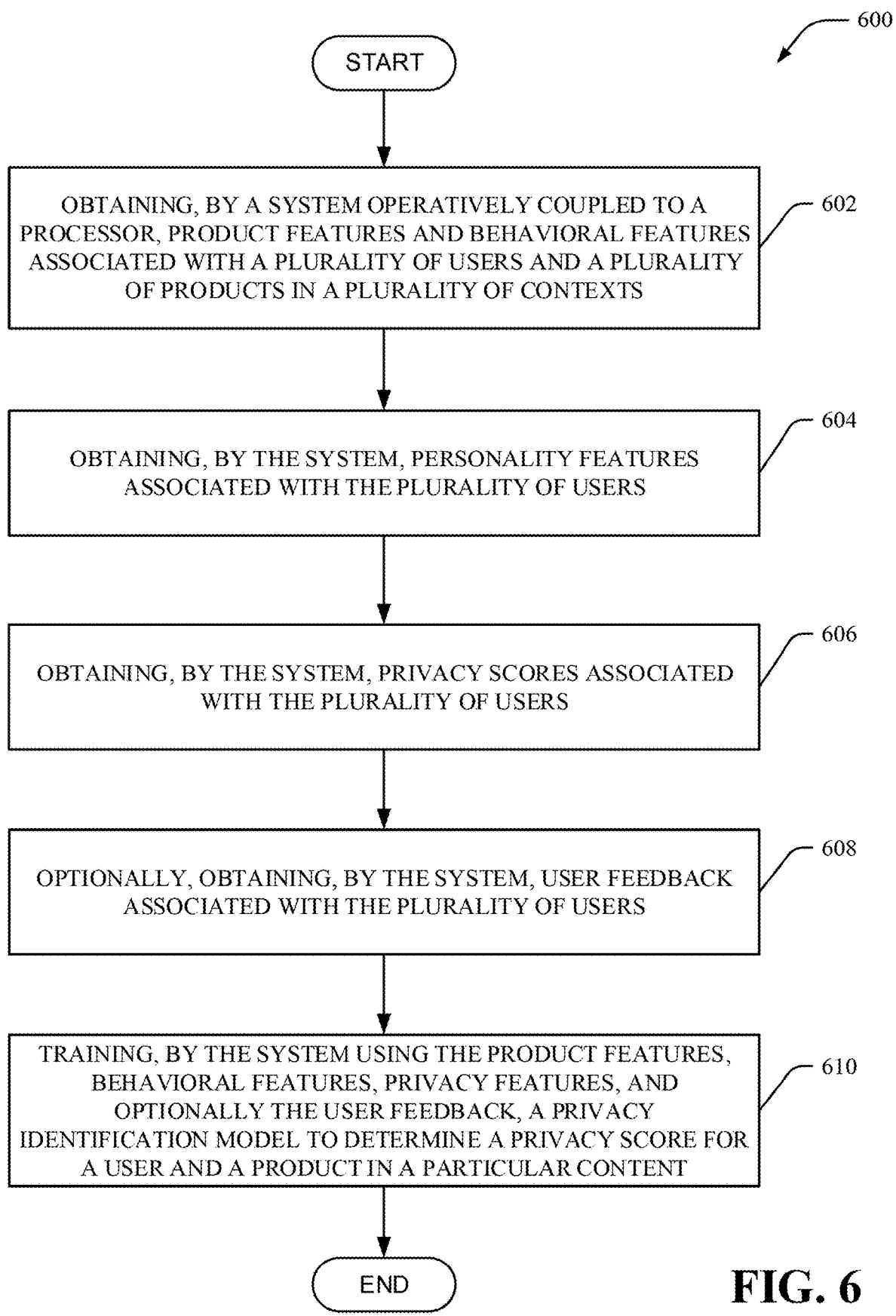
FIG. 6 illustrates a flow diagram of an example, non-limiting computer-implemented method that facilitates training a privacy identification model to determine a privacy score for a user and a product in a particular context in accordance with one or more embodiments described herein.

FIG. 6 illustrates a flow diagram of an example, non-limiting computer-implemented method 600 that facilitates training a privacy identification model to determine a privacy score for a user and a product in a particular context in accordance with one or more embodiments described herein. Repetitive description of like elements employed in other embodiments described herein is omitted for sake of brevity.

At 602, product features and behavioral features associated with a plurality of users and a plurality of products in a plurality of contexts are obtained by a system operatively coupled to a processor (e.g., via a behavioral component 202, a privacy component 104, and/or a server device 102). At 604, personality features associated with the plurality of users are obtained by the system (e.g., via a personality component 204, a privacy component 104, and/or a server device 102). At 606, privacy scores associated with the plurality of users are obtained by the system (e.g., via a model component 206, a privacy component 104, and/or a server device 102). At 608, optionally, user feedback associated with the plurality of users is obtained by the system (e.g., via a model component 206, a privacy component 104, and/or a server device 102). At 610, a privacy identification model is trained to determine a privacy score for a user and a product in a particular content by the system using the product features, behavioral features, privacy features, and optionally the user feedback (e.g., via a model component 206, a privacy component 104, and/or a server device 102).

Figure 7:
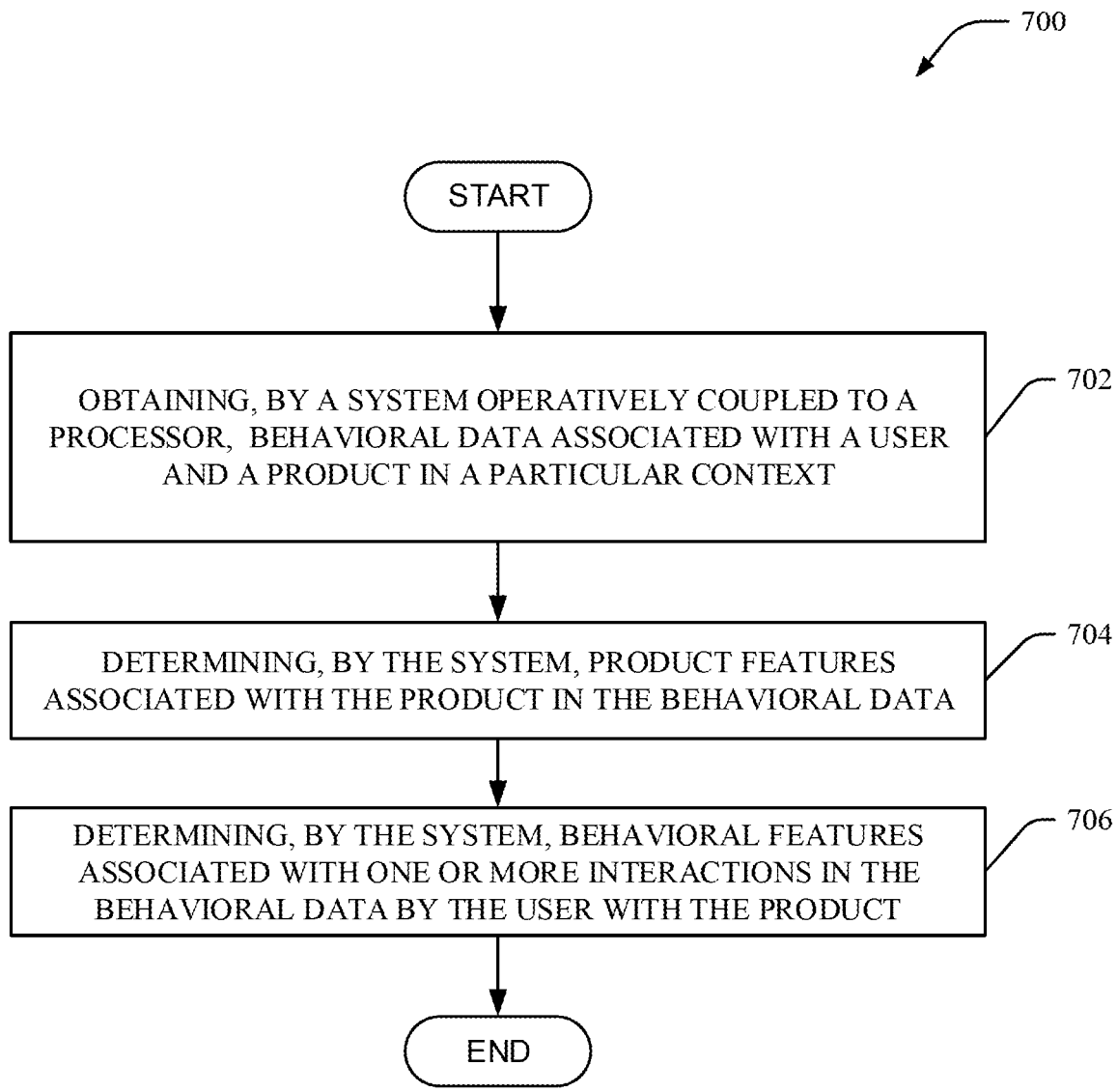
FIG. 7 illustrates a flow diagram of an example, non-limiting computer-implemented method that facilitates determining product features and behavioral features in accordance with one or more embodiments described herein.

FIG. 7 illustrates a flow diagram of an example, non-limiting computer-implemented method 700 that facilitates determining product features and behavioral features in accordance with one or more embodiments described herein. Repetitive description of like elements employed in other embodiments described herein is omitted for sake of brevity.

At 702, behavioral data associated with a user and a product in a particular context is obtained by a system operatively coupled to a processor (e.g., via a behavioral component 202, a privacy component 104, and/or a server device 102). At 704, product features associated with the product in the behavioral data are determined by the system (e.g., via a behavioral component 202, a privacy component 104, and/or a server device 102). At 706, behavioral features associated with one or more interactions in the behavioral data by the user with the product are determined by the system (e.g., via a behavioral component 202, a privacy component 104, and/or a server device 102).

Figure 8:
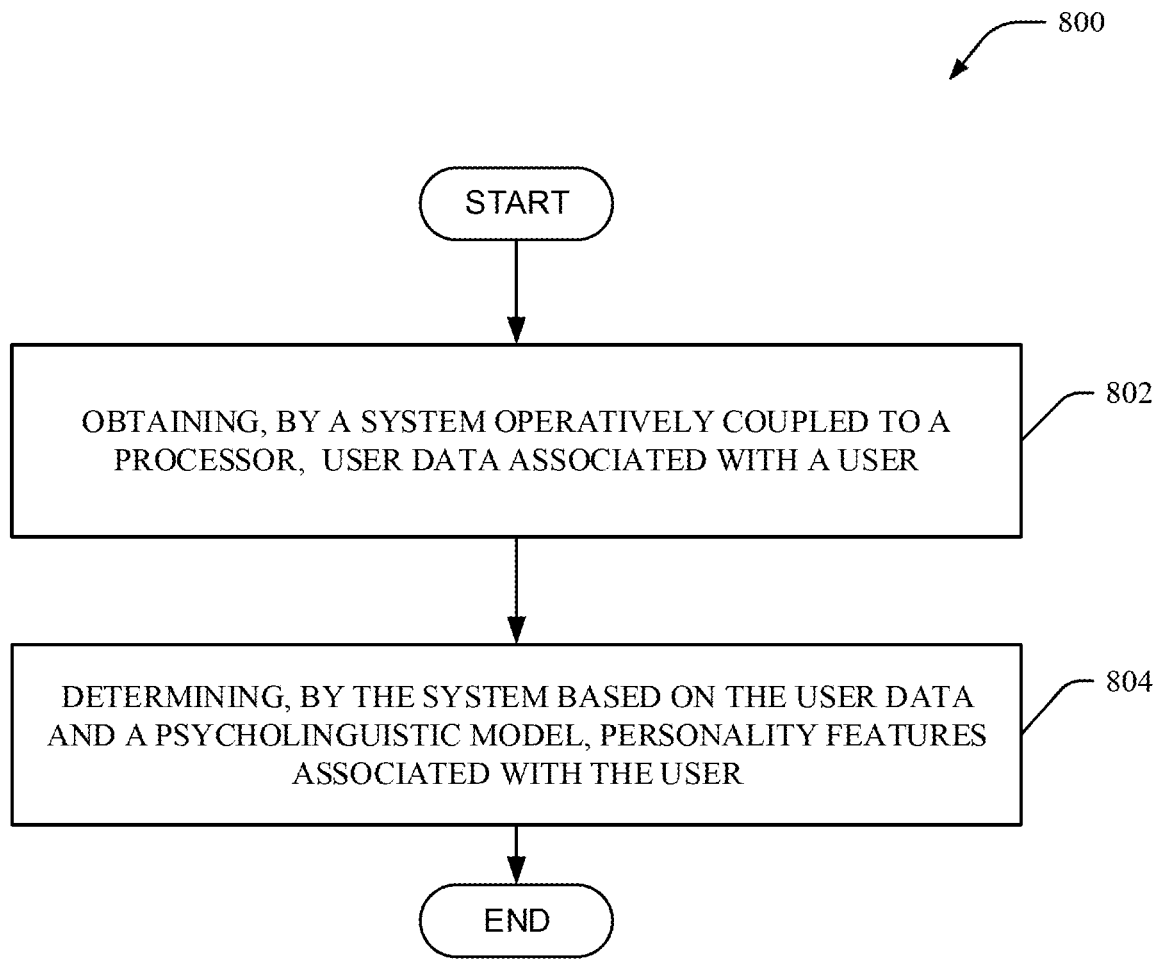
FIG. 8 illustrates a flow diagram of an example, non-limiting computer-implemented method that facilitates determining personality features in accordance with one or more embodiments described herein.

FIG. 8 illustrates a flow diagram of an example, non-limiting computer-implemented method 800 that facilitates determining personality features in accordance with one or more embodiments described herein. Repetitive description of like elements employed in other embodiments described herein is omitted for sake of brevity.

At 802, user data associated with a user is obtained by a system operatively coupled to a processor (e.g., via a personality component 204, a privacy component 104, and/or a server device 102). At 804, personality features associated with the user are determined by the system based on the user data and a psycholinguistic model (e.g., via a personality component 204, a privacy component 104, and/or a server device 102).

Figure 9:
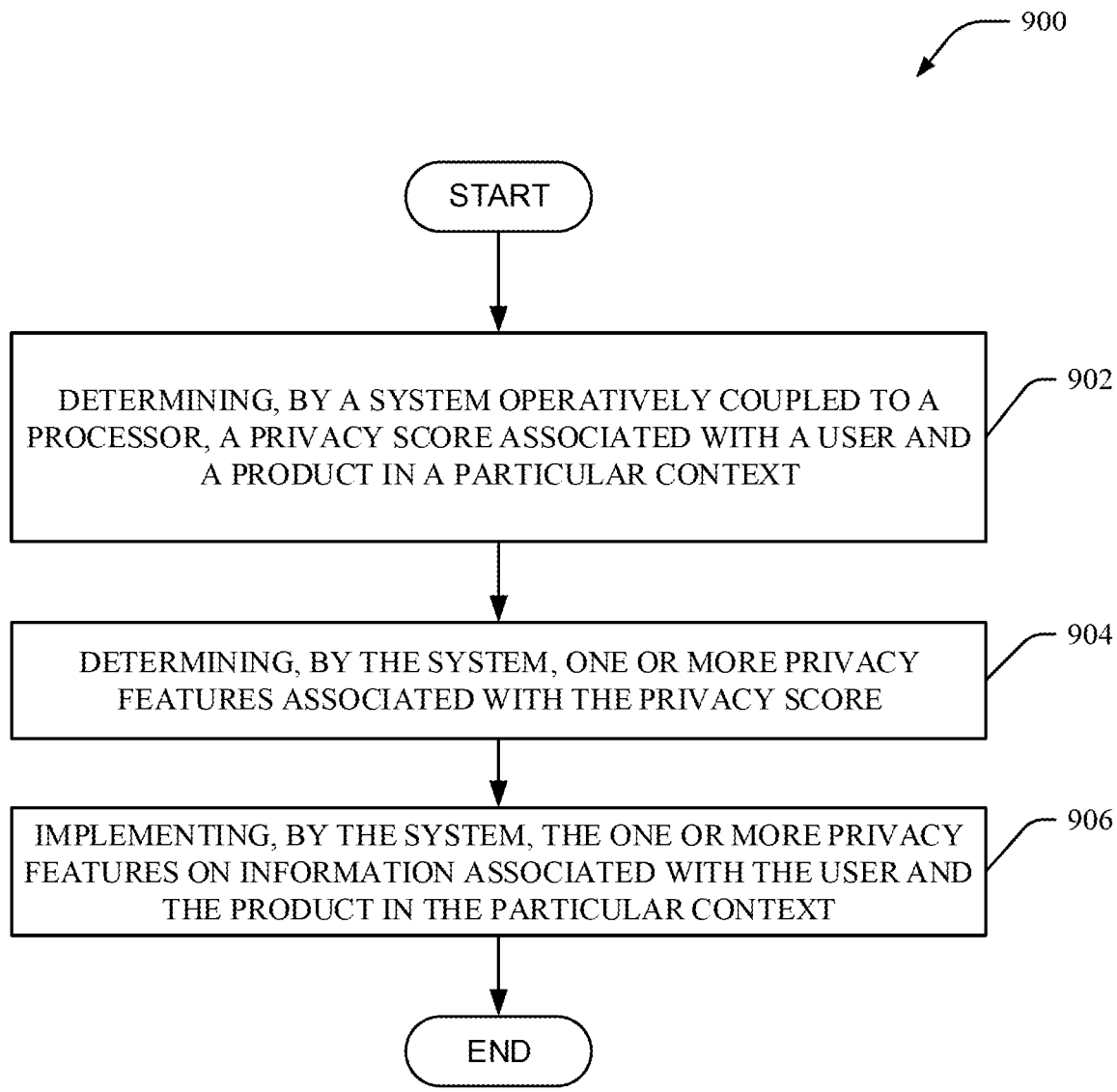
FIG. 9 illustrates a flow diagram of an example, non-limiting computer-implemented method that facilitates implementing one or more privacy features associated with a privacy score in accordance with one or more embodiments described herein.

FIG. 9 illustrates a flow diagram of an example, non-limiting computer-implemented method 900 that facilitates implementing one or more privacy features associated with a privacy score in accordance with one or more embodiments described herein. Repetitive description of like elements employed in other embodiments described herein is omitted for sake of brevity.

At 902, a privacy score associated with a user and a product in a particular context is determined by a system operatively coupled to a processor (e.g., via a privacy scoring component 208, a behavioral component 202, a personality component 204, a model component 206, a privacy component 104, and/or a server device 102). At 904, one or more privacy features associated with the privacy score are determined by the system (e.g., via a privacy enforcement component 210, a privacy component 104, and/or a server device 102). At 906, the one or more privacy features associated with the privacy score are implemented by the system on information associated with the user and the product in the particular context (e.g., via a privacy enforcement component 210, a privacy component 104, and/or a server device 102).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
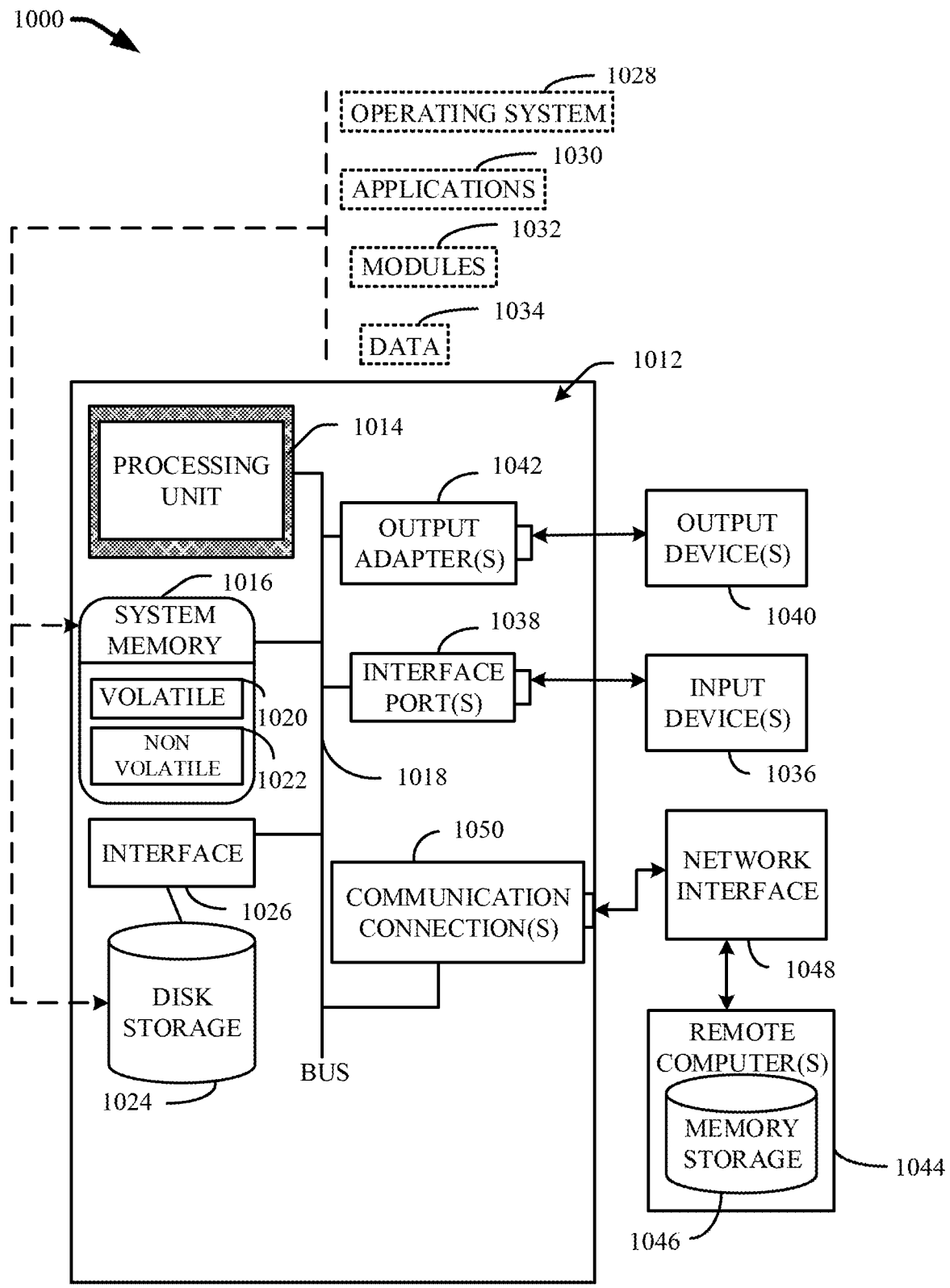
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1001. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/ software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components;
    a processor, operably coupled to the memory, and that executes computer executable components stored in the memory, wherein the computer executable components comprise:
        a privacy scoring component that employs a privacy identification model to generate a privacy score for a user and a product in a particular context based on information associated with the user and the product in the particular context, wherein the privacy score provides an indication of predicted level of privacy that the user desires to maintain for data associated with interactions of the user and the product in the particular context, and the information comprises one or more personality features associated with the user generated by a psycholinguistic model based on text written by the user, wherein the privacy identification model determines the privacy score comprising:
            match the information associated with the user with other information associated with another user of a plurality of users, and
            set the privacy score equal to a particular privacy score selected by the other user for the product in the particular context; and
        a privacy enforcement component that implements one or more privacy features on the information based on the privacy score.

2. The system of claim 1, wherein the information further comprises one or more product features associated with the product, and one or more behavioral features associated with one or more of the interactions of the user and the product.

3. The system of claim 1, further comprising a model component that trains the privacy identification model to determine the privacy score for the user and the product in the particular context using training data comprising personality features associated with the plurality of users, product features associated with a plurality of products, behavioral features associated with interactions of the plurality of users with the plurality of products in a plurality of contexts, and privacy scores associated with the plurality of users, wherein the privacy identification model improves accuracy in determining the privacy score.

4. The system of claim 3, further comprising a personality component that generates the personality features from the psycholinguistic model and the second information associated with the plurality of users.

5. The system of claim 4, wherein the personality component obtains the user data from publicly available sources in which the plurality of users have made the second information available.

6. The system of claim 4, wherein the personality features are selected from the group consisting of openness, conscientiousness, extraversion, agreeableness, and neuroticism.

7. The system of claim 4, wherein the psycholinguistic model is selected from the group consisting of a Linguistic Inquiry and Word Count (LIWC) model, a Parsimonious Rule-based Model, a Satisfaction with Life (SWL) model, and a static ego model.

8. The system of claim 1, wherein the second information is selected from selected from a group consisting of text written by at least one user of the plurality of users and spoken words of the at least one user of the plurality of users that was converted to text.

9. The system of claim 3, further comprising a behavioral component that monitors interactions of the plurality of users with the plurality of products to generate the behavioral features.

10. The system of claim 3, wherein the training data further comprises user feedback regarding privacy.

11. The system of claim 3, wherein the behavioral features are selected from the group consisting of time spent on a webpage associated with the product, time to buy the product, location to buy the product, and action taken on the webpage.

12. The system of claim 3, wherein the product features are selected from the group consisting of product category and targeted customers.

13. The system of claim 1, wherein the privacy enforcement component determines the one or more privacy features based upon a mapping between privacy scores and privacy features, wherein the privacy identification model reduces processing time in implementing the one or more privacy features.

14. The system of claim 1, wherein a privacy feature of the one or more privacy features is selected from a group consisting of a restriction on usage of the information by the system and a restriction on usage of the information by a third party.

15. A computer-implemented method, comprising:
    determining, by a system operatively coupled to a processor, a product feature and a behavioral feature associated with a user and a product in a particular context;
    determining, by the system using a psycholinguistic model, a personality feature associated with the user based on text written by the user; and
    determining, by the system using a privacy identification model, the product feature, the behavioral feature, and the personality feature, a privacy score for the user and the product in the particular context, wherein the privacy score provides an indication of predicted level of privacy that the user desires to maintain for data associated with interactions of the user and the product in the particular context, wherein the determining the privacy score comprises:
        matching the personality feature associated with the user with another personality feature associated with another user of a plurality of users, and setting the privacy score equal to a particular privacy score selected by the other user for the product in the particular context.

16. The computer-implemented method of claim 15, wherein the determining the personality feature associated with the user is further based on information associated with the user.

17. The computer-implemented method of claim 16, wherein the information associated with the user is selected from the group consisting of a blog post written by the user, a posting on a social network site written by the user, an article written by the user, a poem written by the user, a book written by the user, a homework assignment written by the user, a white paper written by the user, an email message written by the user, a text message written by the user, a chat message written by the user, a resume written by the user, and text converted from an audio recording of the user's spoken words.

18. The computer-implemented method of claim 15, wherein the determining the product feature and the behavioral feature further comprises:
  obtaining behavioral data associated with the user and the product in the particular context;
  determining the product feature associated with the product in the behavioral data; and
  determining the behavioral feature associated with one or more of the interactions in the behavioral data by the user with the product.

19. A computer program product for implementing privacy for user information, the computer program product comprising a computer readable storage medium having program instructions embodied therewith, the program instructions executable by a processing component to cause the processing component to:
  determine a privacy score associated with a user and a product in a particular context based on respective scores for personality features associated with the user generated by a psycholinguistic model based on text written by the user, wherein the privacy score provides an indication of predicted level of privacy that the user desires to maintain for the user information associated with interactions of the user and the product in the particular context, wherein the determine a privacy score comprises:
    match the respective scores for the personality features associated with the user with respective other scores for the personality features associated with another user of a plurality of users, and
    set the privacy score equal to a particular privacy score selected by the other user for the product in the particular context;
  determine one or more privacy features associated with the privacy score; and
  implement the one or more privacy features on information associated with the user and the product in the particular context.

20. The computer program product of claim 19, wherein the personality features are selected from the group consisting of openness, conscientiousness, extraversion, agreeableness, and neuroticism.

* * * * *